(12) United States Patent
Okemoto et al.

(10) Patent No.: US 10,270,144 B2
(45) Date of Patent: Apr. 23, 2019

(54) MAGNESIUM FUEL ELEMENT, MAGNESIUM AIR BATTERY, AND ELECTRONICS

(71) Applicant: YTS SCIENCE PROPERTIES PTE. LTD., Singapore (SG)

(72) Inventors: Kyoko Okemoto, Tokyo (JP); Takashi Yabe, Tokyo (JP)

(73) Assignee: MGR Energy LLP, Tokyo (JP)

( * ) Notice: Subject to any disclaimer, the term of this patent is extended or adjusted under 35 U.S.C. 154(b) by 148 days.

(21) Appl. No.: 15/301,714

(22) PCT Filed: Sep. 3, 2014

(86) PCT No.: PCT/JP2014/073145
§ 371 (c)(1),
(2) Date: Oct. 3, 2016

(87) PCT Pub. No.: WO2015/151311
PCT Pub. Date: Oct. 8, 2015

(65) Prior Publication Data
US 2017/0117599 A1 Apr. 27, 2017

(30) Foreign Application Priority Data
Apr. 2, 2014 (JP) ................................. 2014-075911

(51) Int. Cl.
| H01M 12/06 | (2006.01) |
| H01M 16/00 | (2006.01) |
| H01M 4/46 | (2006.01) |
| H01M 2/18 | (2006.01) |
| H01M 10/0525 | (2010.01) |
| H01M 4/38 | (2006.01) |
| H02J 7/00 | (2006.01) |

(52) U.S. Cl.
CPC ........... *H01M 12/065* (2013.01); *H01M 2/18* (2013.01); *H01M 4/38* (2013.01); *H01M 4/381* (2013.01); *H01M 4/466* (2013.01); *H01M 10/0525* (2013.01); *H01M 16/00* (2013.01); *H02J 7/0054* (2013.01); *H02J 7/0063* (2013.01); *H01M 2220/30* (2013.01)

(58) Field of Classification Search
CPC ........... H01M 10/0525; H01M 12/065; H01M 16/00; H01M 2220/30; H01M 2/18; H01M 4/381; H01M 4/466
See application file for complete search history.

(56) References Cited

FOREIGN PATENT DOCUMENTS

| JP | 2004362868 A | 12/2004 |
| JP | 2010062074 A | 3/2010 |
| JP | 2012015013 A | 1/2012 |
| WO | WO 2013/098997 | 7/2013 |

*Primary Examiner* — Carlos Barcena
(74) *Attorney, Agent, or Firm* — Wong & Rees LLP; Kirk D. Wong (57) ABSTRACT

A magnesium fuel element (100) comprises the magnesium thin plate (101), the front surface separator (102), and the back separator (103), and functions as a fuel for the magnesium air battery. The front surface separator (102) and the back separator (103) are folded, and the plurality of magnesium thin plates (101) are arranged in a stacked manner. The front surface separator (102) and the back separator (103) will be expanded, if the magnesium thin plate (101) moves parallel to the front surface.

20 Claims, 6 Drawing Sheets

MAGNESIUM FUEL ELEMENT, MAGNESIUM AIR BATTERY, AND ELECTRONICS

CLAIM OF PRIORITY

This application is a US National Stage Patent Application filed under 35 U.S.C. § 371 based upon International Patent Application No. PCT/JP2014/073145 filed Sep. 3, 2014, which claims the benefit of Japanese Application 2014-075911, filed Apr. 2, 2014, the entire contents of all of which are hereby incorporated by reference as if fully set forth herein for all purposes.

TECHNICAL FIELD

The present invention relates to a magnesium fuel element, a magnesium air battery, and electronics.

BACKGROUND ART

Patent Document 1 discloses a cartridge type of a magnesium air battery, as an example of a magnesium air battery, which active material is oxygen in the air as a cathode, and magnesium as an anode. Specifically, in the magnesium air battery described in Patent Document 1, each end of the magnesium film is connected to the pair of reels, and along with the magnesium film being wound by rotating the reels, magnesium films between the reels will generate power in cooperation with the cathode, which is located in the vicinity thereof.

PRIOR ART DOCUMENTS

Patent Literature

Patent Literature 1: Patent Publication No. 2012-15013

SUMMARY OF INVENTION

Technical Problem

The thickness of the magnesium effects the response speed and duration in the magnesium air battery, which is one of the important factors that determine the characteristics of the battery. It is necessary to use magnesium in various thicknesses, in order to develop a battery with a variety of characteristics. However, it will be difficult to wind magnesium in a cylindrical form, if the thickness of magnesium exceeds 100 μm. Therefore, in the structure of magnesium air battery stated in Patent Document 1, where magnesium film is wound on reels, there is a problem that the thickness of magnesium possible to be used will be limited to about 100 μm.

A new structure other than the magnesium film being wound on reels is necessary, in order to enable continuous introduction and extraction to the electrode of any magnesium thickness, including those in excess of 100 μm, and to construct a magnesium air battery.

The present invention has been made in a view of the related challenge, and seeks to enable continuous introduction and extraction to magnesium fuel element in the vicinity of the electrode, any designable thickness of magnesium fuel element, a magnesium air battery comprising such magnesium fuel element, and electronics, comprising such magnesium air battery.

Solution to Problem

In order to meet the above object, magnesium fuel element according to a first aspect of the present invention, comprising:

a plurality of magnesium thin plates containing magnesium, connecting each surface of said plurality of magnesium thin plates, wherein a surface separator, one side, and the back, which are foldable along said plurality of magnesium thin plates, connecting each back of said plurality of magnesium thin plates, comprising a back separator, which is foldable along each surface of said plurality of magnesium thin plates, the other side, and the back, said surface separator and said back separator is folded, arranged to stack said plurality of magnesium thin plates, said surface separator and said back separator connected to such magnesium thin plates expand, if one of said plurality of magnesium thin plates is moved in parallel in surface.

Said surface separator is connected to the central part of the respective surfaces of said plurality of magnesium thin plates, accordion-foldable, said back separator is connected to respective central back part of said plurality of magnesium thin plates, and may be accordion-foldable.

At least one of said surface separator and said back separator may be formed from a transparent film which transmits ions.

At least one of said surface separator and said back separator may comprise a hole which engages with a drive unit for moving said magnesium thin plates.

Magnesium air battery according to a second aspect of the present invention: comprising: magnesium fuel element according to a first aspect of the present invention, an electrode, comprising, one of the plurality of magnesium thin plates inserted into said electrode, generates an electromotive force with such magnesium thin plates as a fuel, magnesium thin plates after the reaction are drawn from said electrode.

Each said plurality of magnesium thin plates prior to reaction and said plurality of magnesium thin plates after reaction, may be arranged to be stacked.

Said electrode may comprise an inlet for inserting said magnesium thin plates, an outlet for withdrawing said magnesium thin plates, a cathode with conductivity that supplies electrons to oxygen, electrolyte hold-back agent in contact with said cathode and said magnesium fuel element, which impregnate and retain electrolytes.

Said cathode may be formed from at least one of carbon, metal or manganese oxide.

Electronic equipment according to a third aspect of the present invention, comprises a magnesium air battery according to a second aspect of the present invention, Further comprising a rechargeable secondary battery, said secondary battery may be charged by causing an electromotive force in said magnesium air battery, if the remaining capacity of said secondary battery is equal to or less than the threshold.

Advantageous Effects of Invention

According to the present invention, magnesium fuel element with capacity of continuous introduction, extraction, and designable for any thickness in the vicinity of the electrode, magnesium air battery comprising the magnesium fuel element, electronics comprising the magnesium air battery may be provided.

DESCRIPTION OF EMBODIMENTS

Hereinafter, embodiments of the present invention will be described with reference to the drawings.

Figure 1A:
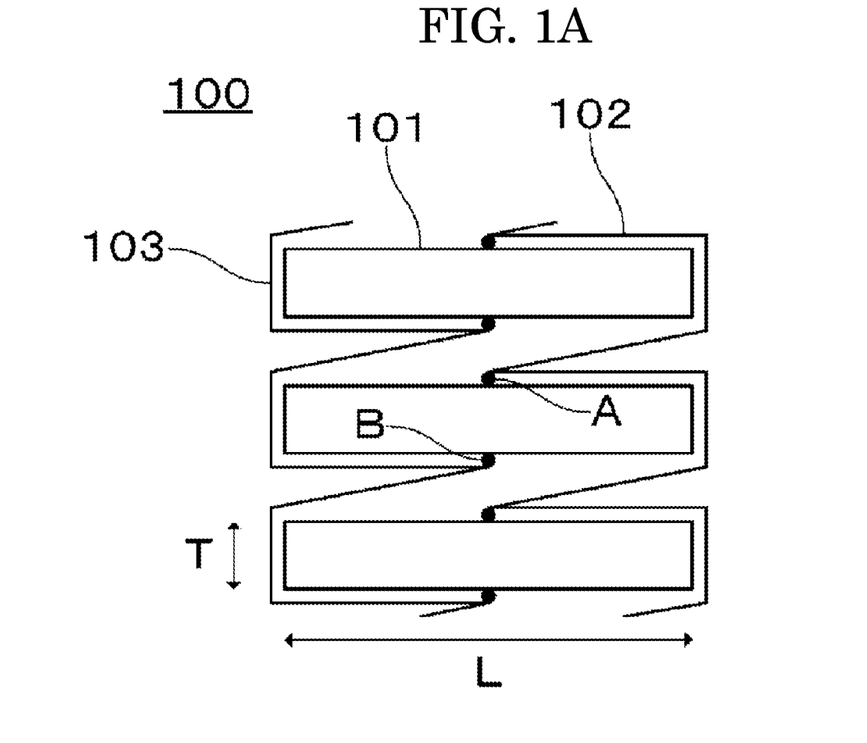
FIG. 1A is a side view showing a schematic construction in a state of magnesium fuel element being folded, according to one embodiment.
Figure 1B:
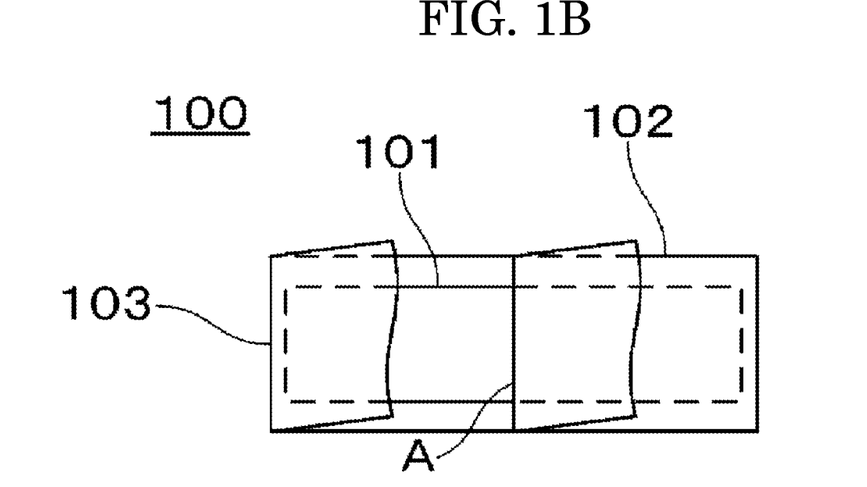
FIG. 1B is a plan view showing a schematic construction in a state of magnesium fuel element being folded, according to one embodiment.

First, the construction of magnesium fuel element 100 will be described. FIG. 1A is a side view showing a schematic construction in a state of magnesium fuel element 100 being folded, and FIG. 1B is a plan view thereof. The magnesium fuel element 100 comprises a plurality of magnesium thin plates 101, a surface separator 102, and a back separator 103, as shown in FIG. 1. Magnesium fuel element 100 functions as a fuel of the magnesium air battery.

The magnesium thin plate 101 is a thin metal magnesium plate, which lengths are long side L with strip formed thickness T. Magnesium thin plate 101 is connected to a surface separator 102 at the central part of the other side (surface), which is position A, the short side from L/2. In addition, it is connected to separator 103 at position B, which is the central part of the other surface (back). Multiple magnesium thin plates 101 are connected at substantially equal intervals in the surface of the separator 102 and the back separator 103, which intervals are (L+T).

The surface separator 102 and the back separator 103 function as separators of magnesium air battery. The surface separator 102 and the back separator 103 transmit through the ions necessary for the oxidation-reduction reaction, transparent films having flexibility, and are formed by non-woven fabrics, ion exchange resin, as an example. The surface separator 102 is folded at position A, along with the surface, one side, and the back of the magnesium thin plate 101, so as to be in close contact with magnesium thin plate 101. Similarly, the back separator 103 is bent at the surface of the magnesium thin plate 101, so as to be in close contact with the magnesium thin plate 101, and is bent on the other side and the back, along with being bent at position B. As a whole, the surface of the separator 102 and the back separator 103 are folded in accordion shapes.

Figure 2:
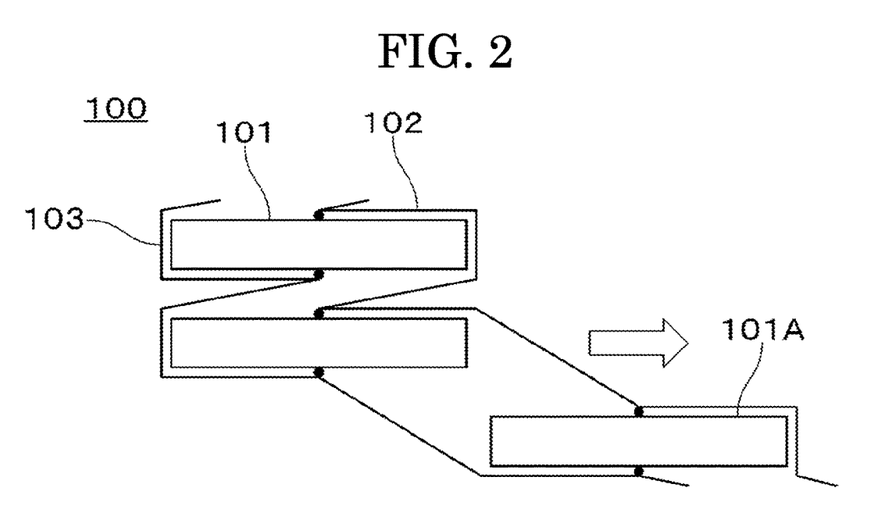
FIG. 2 is a side view showing a schematic construction in a state where a part of magnesium fuel element is expanded, according to the embodiment.

FIG. 2 is a side view showing a schematic construction in a state where a part of magnesium fuel element 100 is expanded. The surface separator 102 and the back separator 103, being bent at the surface side of the magnesium thin plate 101 will expand, if the magnesium thin plate 101A moves in a direction parallel to the surface, along with the long side (the direction of the arrow in the FIG.) thereof.

The expanded surface separator 102 and the back separator 103 will be bent again, and return to the state shown in FIG. 1, if magnesium thin plate 101A moves in the opposite direction of the arrow, from the state shown in FIG. 2.

Figure 3:
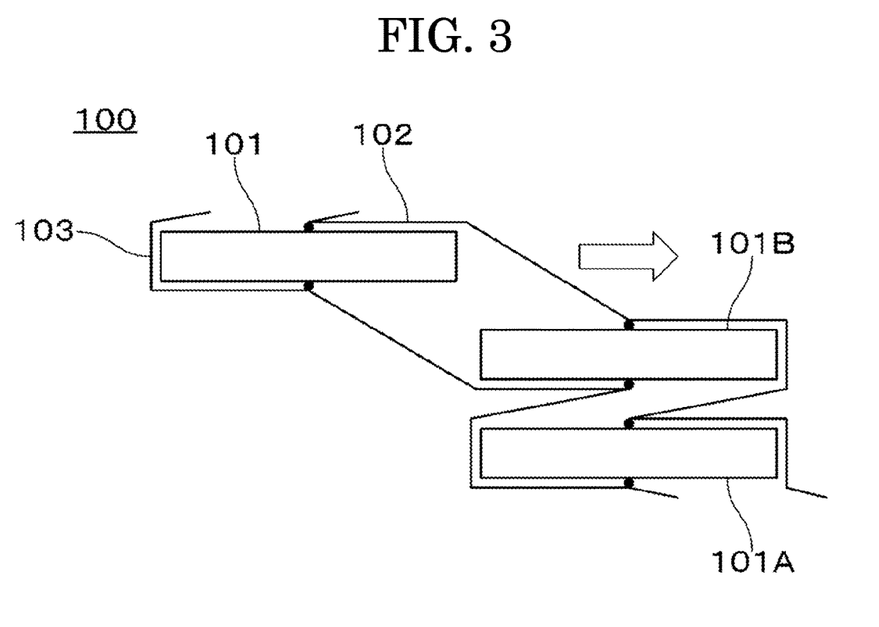
FIG. 3 is a side view showing a schematic construction in a state where a part of magnesium fuel element is expanded, according to the embodiment.

The expanded surface separator 102 and back separator 103 between magnesium thin plates 101A and 101B will be bent again, along with the surface separator 102 and the back separator 103, being bent at the surface side of the magnesium thin plate 101B will expand, and magnesium thin plates 101A and 101B will overlap again, if the magnesium thin plate 101B above the magnesium thin plate 101A moves in the direction of the arrow, from that shown in the state of FIG. 2 to FIG. 3

In this manner, any magnesium thin plate 101 may shift from the state being bent to the state being expanded or shift to the state being overlapped again, by moving both in parallel in a direction to the surface and to the long side.

Then, the magnesium air battery 200 that uses the magnesium fuel element 100 as a fuel will be described.

The magnesium air battery 200 comprises electrode 300, and generates an electromotive force with magnesium fuel element 100 as a fuel.

Figure 4A:
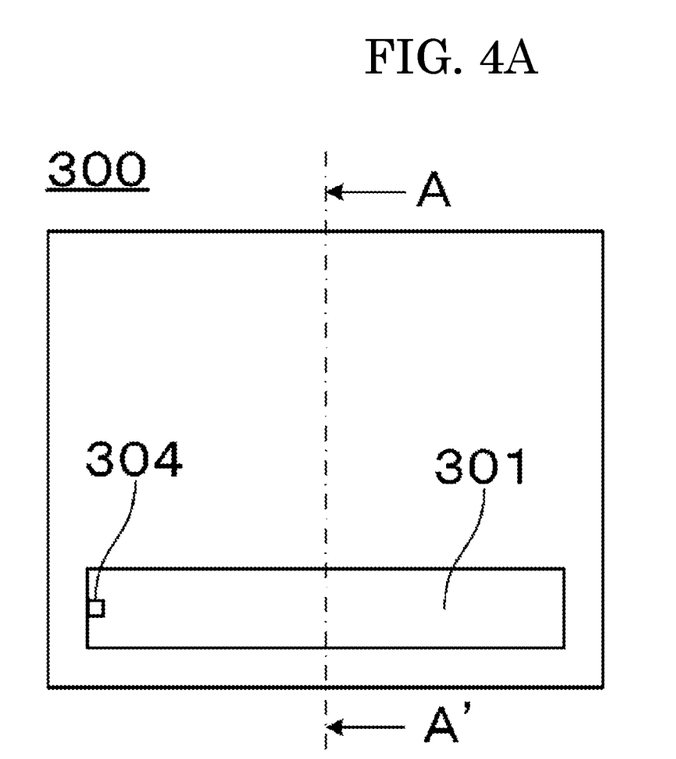
FIG. 4A is a side view showing a schematic construction of an electrode, according to the embodiment.
Figure 4B:
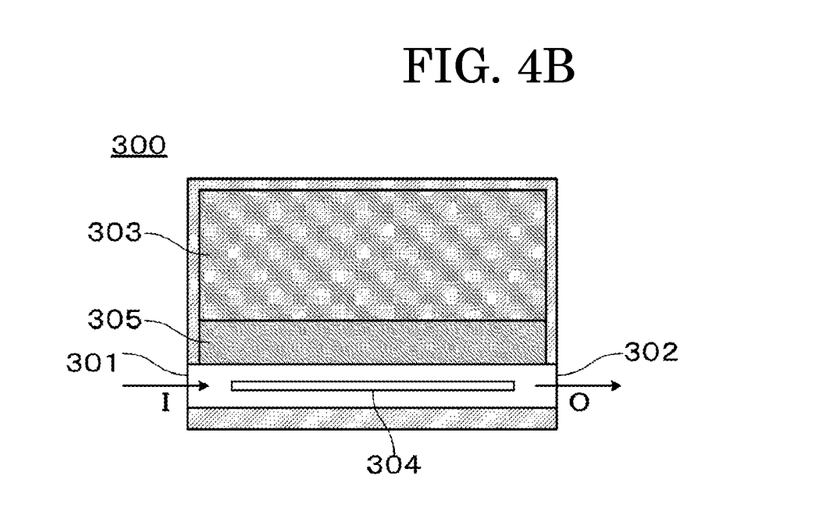
FIG. 4B is a cross-sectional view showing a schematic construction of an electrode, according to the embodiment.

FIG. 4A is a side view showing a schematic construction of the electrode 300, and FIG. 4B is an A-A' arrow sectional view thereof. The electrode 300 comprises an inlet 301, an outlet 302, a cathode 303, an anode 304, and an electrolyte hold-back agent 305.

The inlet 301 is formed in one side surface of the electrode 300. The magnesium air battery 200 generates an electromotive force if, the magnesium thin plate 101 is inserted in the direction of the arrow I, from the inlet 301 into the interior of the electrode 300, and is used as a fuel for the magnesium air battery 200.

The outlet 302 is formed on the opposite side where the inlet 301 of the electrode 300 was formed. The magnesium thin plate 101, exhausted by being used as a fuel, will be withdrawn from the outlet 302 in the direction of the arrow O.

The cathode 303 is formed of materials with conductivity, and supplies electrons to the oxygen in the air, which is a cathode active material of the magnesium air battery 200. The cathode 303 shall have large surface area and to adsorb oxygen easily, in order to promote the reaction for reducing oxygen. Materials for forming cathode 303 include carbon, metals, manganese compounds, and those combining thereto, as an example but is not limited to thereto. Regarding carbon, these forms may include activated carbon, carbon powder, carbon fibers, carbon nanotubes, and carbon felt.

The anode 304 is formed of materials with conductivity, being electrically connected to the magnesium fuel element 100 inserted into the electrode 300. In this embodiment, it will be electrically connected to the side surface of the magnesium thin plate 101.

The electrolyte hold-back agent 305 impregnates and holds an electrolyte. The electrolyte hold-back agent 305 is sandwiched between the magnesium fuel element 100 and the cathode 303, and is installed so as to be in contact with each. Regarding materials that form electrolyte hold-back agent 305, filter paper, nonwoven fabric, felt, carbon felt, and gel may be included, as an example, but is not limited thereto.

The electrolyte is an electrolyte that enables ion exchanges between magnesium fuel element 100 and cathode 303. In addition, water contained in the electrolyte is used as a reaction in which oxygen is reduced at cathode 303. The electrolyte is an aqueous sodium chloride solution, as an example, but is not limited thereto.

Next, how to use the magnesium fuel assembly 100 as a fuel of the magnesium air battery 200 will be described referring to FIGS. 5 to 9. FIGS. 5 to 9 are side views showing schematic constructions of magnesium air battery 200. Note that the drawings of the connection part between magnesium thin plate 101, the surface separator 102, and the back separator 103 are omitted in FIGS. 5 to 9.

Figure 5:
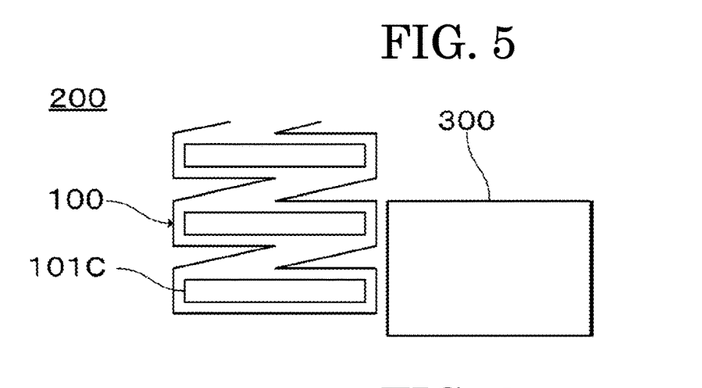
FIG. 5 is a side view showing a schematic construction of magnesium air battery, according to the embodiment.

First, the magnesium fuel element 100 is placed in the vicinity of the electrode 300, as shown in FIG. 5. Magnesium thin plate 101C at the bottom of the magnesium fuel element 100 is placed to fit the inlet 301 in this case. Regarding the magnesium thin plate 101C, the surface separator 102 at the bottom of thereof is also connected to the magnesium thin plate 101C in the same position as the back separator 103.

Figure 6:
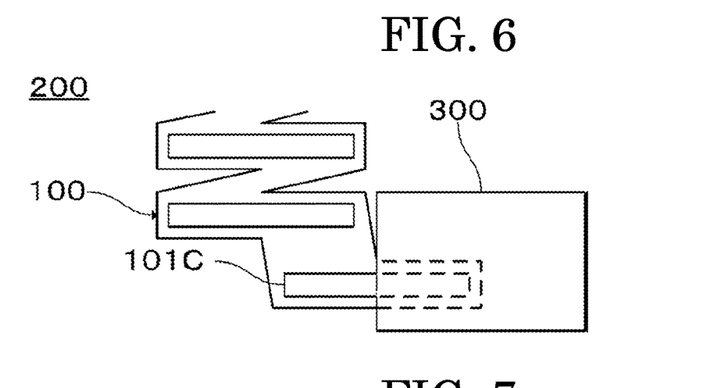
FIG. 6 is a side view showing a schematic construction of magnesium air battery, according to the embodiment.

Next, the magnesium thin plate 101C moves in a direction parallel to the surface, along with the long side (the direction of the arrow in the FIG.) thereof being inserted into the electrode 300 through the inlet 301, as shown in FIG. 6. It will be connected to the magnesium thin plate 101C, the surface separator 102, and the back separator 103, which has been bent, will gradually expand in this case.

Figure 7:
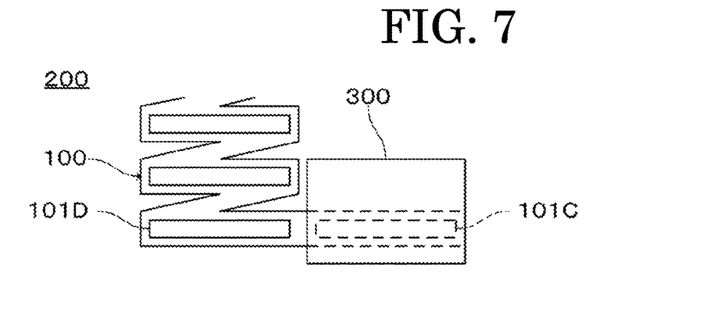
FIG. 7 is a side view showing a schematic construction of magnesium air battery, according to the embodiment.

Next, the magnesium thin plate 101C will fully move, being completely inserted into the electrode 300, as shown in FIG. 7. The entire magnesium fuel element 100 will move in a downward direction at the same time, being placed in a position where the magnesium thin plate 101D from the second bottom fits into the inlet 301, and the surface separator 102 and the back separator 103 will be fully expanded.

In the state of FIG. 7, the surface separator 102 and the back separator 103 will be fully expanded, the surface of the surface separator 102 covering the magnesium thin plate 101C, and the back separator 103 magnesium covering the back of thin plate 101C, in close contact with each. The surface separator 102 acts as a separator of the magnesium air battery at the electrode 300 in this state, the electrolyte by exchanging ions, shifts the oxygen in the air to an cathode active material, causes electromotive force with oxidation-reduction reaction that shifts magnesium contained in the magnesium thin plate 101C to an anode active material. The magnesium thin plate 101C, which is inserted into the electrode 300, will gradually exhaust with the progress of the reaction.

Figure 8:
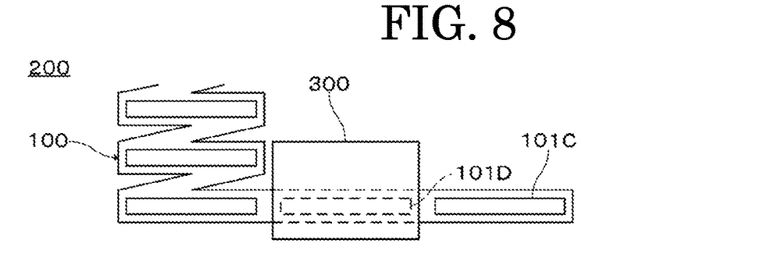
FIG. 8 is a side view showing a schematic construction of magnesium air battery, according to the embodiment.

Magnesium thin plate 101C will be withdrawn from the electrode 300, when the magnesium thin plate 101C fully exhausts with the progress of the reaction, as shown in FIG. 8. The following magnesium thin plate 101D is inserted into the electrode 300, at the same time, and the entire magnesium fuel element 100 will move downward.

Figure 9:
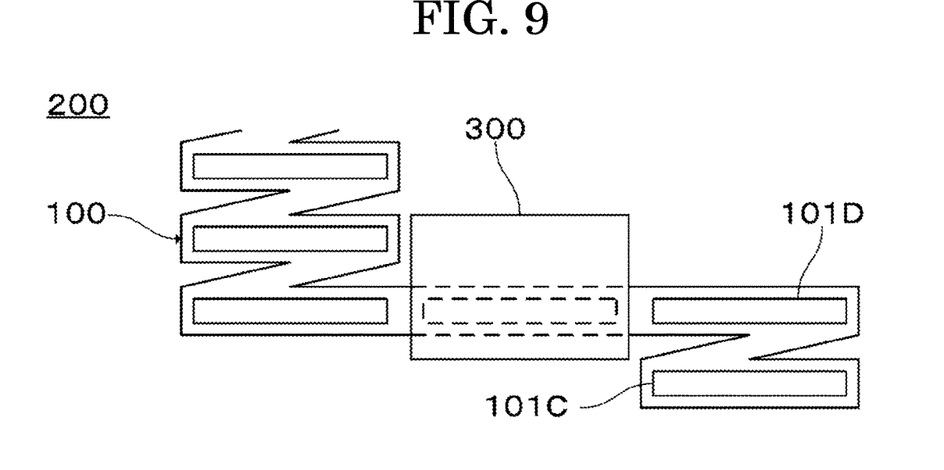
FIG. 9 is a side view showing a schematic construction of magnesium air battery, according to the embodiment.

The previously withdrawn magnesium thin plate 101 will move downward and will be stacked as before used, if the next exhausted magnesium thin plate 101 is drawn in the presence of exhausted magnesium thin plate 101. Magnesium thin plate 101D will be withdrawn from the electrode 300, when the magnesium thin plate 101D fully exhausts with the progress of the reaction, as shown in FIG. 9. The previously withdrawn magnesium thin plate 101C will move downward at the same time, being connected between the magnesium thin plate 101C and magnesium thin plate 101D, and the surface separator 102 and back separator 103 which has been expanded will be folded again.

Thus, the magnesium air battery 200 may continue to generate electromotive force, using any thickness magnesium as a fuel with element 100 being inserted into the electrode 300 and also being withdrawn sequentially. In addition, since the magnesium fuel element 100 are stacked before and after use, magnesium fuel element 100 itself, and magnesium air battery 200 that use magnesium fuel element 100 may be formed smaller.

Figure 10:
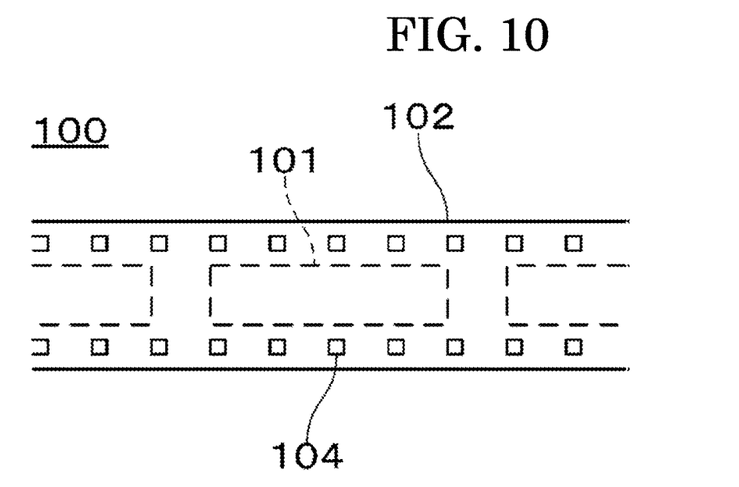
FIG. 10 is a plan view showing a schematic construction in a state of magnesium fuel element being deployed, according to one embodiment.

How to insert the magnesium thin plate 101 into the electrode 300, and to move the magnesium thin plate 101, when withdrawing, may adopt any methods. Making a hole 104 at regular intervals on at least one side of the surface separator 102 and the back separator 103 (surface separator 102 in FIG. 10), engage gears as a drive unit, and move magnesium thin plate 101 by rotating such gears, as an example shown in FIG. 10 may be adopted. Also, it may be moved by pushing the magnesium thin plate 101 from the side or surface.

Then, as a power source for electronics, how to use the magnesium air battery 200 will be described.

Figure 11:
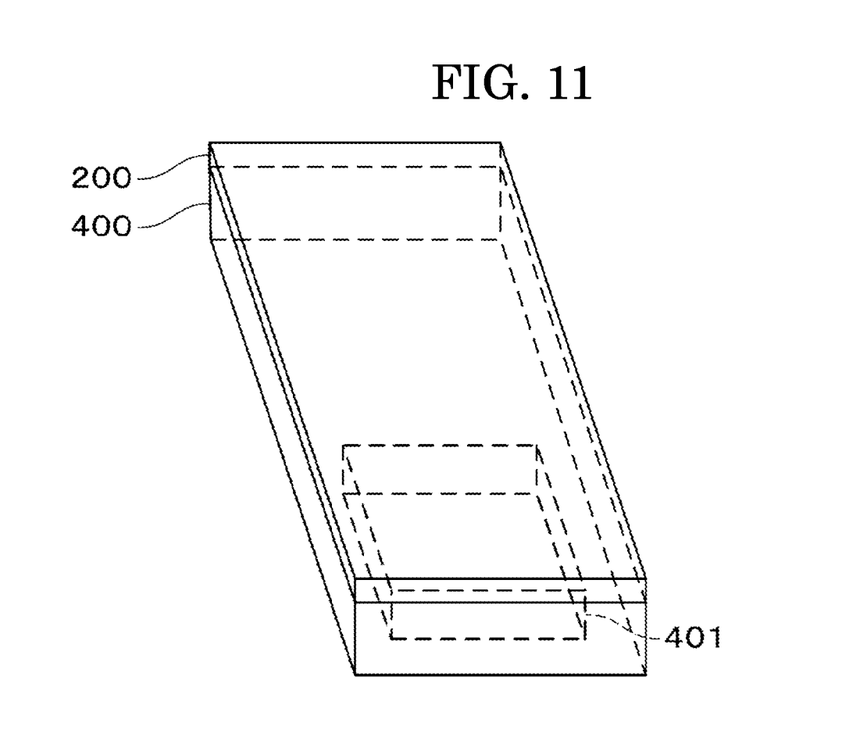
FIG. 11 is a perspective view showing a schematic construction of electronics, according to the embodiment.

FIG. 11 is a perspective view showing a schematic construction of electronics 400, which power supply is magnesium air battery 200. The electronics 400 comprises a secondary battery 401, and magnesium air battery 200 is mounted, as shown in FIG. 11.

The electronics 400 is electronics, including mobile phone, smart phone, personal computer which operates by power supplied from batteries. The electronics 400 is electrically connected to magnesium air battery 200 with a cable or a connection adapter (not illustrated) as an example.

The secondary battery 401 is a rechargeable secondary battery, including lithium ion secondary battery as an example. The secondary battery 401 is a direct power source for operating electronics 400.

The electronics 400 is operated by power supplied from the secondary battery 401. The electronics 400 monitor the remaining capacity of the secondary battery 401, and generates an electromotive force to the magnesium air battery 200, if the remaining capacity of the secondary battery 401 becomes smaller than the threshold. This may be performed by an application introduced into the electronics 400. Any electronics will be operated by magnesium air battery 200 by introducing this application software.

The magnesium air battery 200 may be used as a power source for the electronics 400 by using the magnesium air battery 200 in such manner.

The construction of attaching the magnesium air battery 200 to the external of the electronics 400 enables even those comprising the rechargeable battery 401 as a power source to use the magnesium air battery 200 as a power source. In addition, since the appearance of the magnesium air battery 200 may be constructed freely, it may also be configured to decorate the electronics 400.

Magnesium air battery 200 after use may be collected at a convenience store as an example, and may be reused by replacing the magnesium fuel element 100. The collected magnesium after the reaction fuel assembly 100 may be used as a raw material, while making a new magnesium fuel element 100 in this case.

The capacity of the magnesium air battery may be larger than the lithium ion secondary battery of the same size thereof, electronics may be used for a long time, using the above-mentioned magnesium air battery, without charging from the AC power supply.

Note that the surface separator 102 and the back separator 103, may be integrated in the upper end part of the magnesium fuel element 100, which is at the surface of the magnesium thin plate 101 at the top. The surface separator 102 and the back separator 103 are formed integrally in a ribbon-form in this case. The same applies to the lower end of the magnesium fuel element 100. In addition, both the upper and lower ends of the magnesium fuel element 100 may be integrated. The surface separator 102 and the back separator 103 will be formed integrally in a ring-form in this case.

Having thus described on embodiments of the present invention, the present invention is not limited to the above embodiments.

The magnesium thin plate 101 was described to be formed from metallic magnesium, as an example, but not limited thereto. That means, any magnesium fuel element 101 intended to elute magnesium ions are accepted, and may be formed from alloy containing magnesium or magnesium compound.

In addition, the magnesium thin plate 101 was described to be connected with the surface separator 102 at the center of the surface, but is not limited thereto. That means, it may be connected at any points other than the center part of the surface and may be connected with two or more positions. The same applies to the back separator 103. However, in the construction where the surface separator 102 and the back separator 103 is connected at the center of each face, the surface separator 102 and the back separator 103 may be folded easily.

In addition, the surface separator 102 and the back separator 103 were described to transmit ions necessary for the oxidation-reduction reactions, but is not limited thereto. That means, at least one of the surface separator 102 and back separator 103 may transmit ions necessary for the oxidation-reduction reactions. The other separator may be formed with films, including insulating film and conductive film, as an example in this case. The anode 304 of the electrode 300 may be configured to be the separator contacting the other separator, if such separator was formed with conductive film.

In addition, the electrode 300 was described to comprise one cathode 303 and the electrolyte hold-back agent 305 respectively, but is not limited thereto. That means, the electrode 300 may comprise cathode 303 and electrolyte hold-back agent 305 two each, and may be installed so as to sandwich the magnesium fuel element 100. The surface separator 102 and the back separator 103 will both pass through the necessary ions at this time. Magnesium air batteries will be connected in parallel, if connecting the two cathodes, and may increase the current to extract.

In addition, the electronics 400 was described to generate electromotive force to the magnesium air battery 200, if the remaining capacity of the secondary battery 401 becomes less than the threshold value, but is not limited thereto. That means, the secondary battery 401 may be charged, that is the power consumption of the electronics 400, depending on the application use condition, as an example, and may generate electromotive force to the magnesium air battery 200.

In addition, the magnesium air battery 200 was described to be attached to the electronics 400, but is not limited thereto. That means, the magnesium air battery 200 may be arranged inside the electronics 400.

In addition, the electronics 400 was described to comprise the secondary battery 401, and the magnesium air battery 200 to charge the secondary battery 401, but is not limited thereto. That means, the electronics 400 may be operated directly without going through the power supply from the secondary battery 401 but with the power supply from the magnesium air battery 200.

EXPLANATION OF REFERENCES

100 Magnesium Fuel Element
101,101A-101D Magnesium Thin Plate
102 Surface Separator
103 Back Separator
104 Hole
200 Magnesium Air Battery
300 Electrode
301 Inlet
302 Outlet
303 Cathode
304 Anode
305 Electrolyte Hold-back Agent
400 Electronics
401 Secondary Battery

What is claimed is:

1. A magnesium fuel element comprising:
   a plurality of magnesium plates containing magnesium;
   a surface separator connecting each front surface of said plurality of magnesium plates, foldable along said plurality of magnesium plates;
   a back separator connecting each back surface of said plurality of magnesium plates, foldable along said plurality of magnesium plates;
   wherein, when said surface separator and said back separator is folded, said plurality of magnesium plates are arranged in a to stack;
   wherein said surface separator and said back separator connected to the magnesium plates expand, if one of said plurality of magnesium plates is moved in parallel to the front surface.

2. The magnesium fuel element of claim 1, wherein:
   said surface separator is connected to a central part of the respective front surfaces of said plurality of magnesium plates, and is accordion-foldable;
   said back separator is connected to a respective central part of the respective back surfaces of said plurality of magnesium plates, and is accordion-foldable.

3. The magnesium fuel element of claim 1, wherein:
   at least one of said surface separator and said back separator is formed from a transparent film which transmits ions.

4. The magnesium fuel element of claim 1, wherein:
   at least one of said surface separator and said back separator comprises a hole which engages with a drive unit for moving said magnesium plates.

5. The magnesium fuel element of claim 1, wherein:
   at least one of said surface separator and said back separator is formed from a transparent film which transmits ions; and at least one of said surface separator and said back separator comprises a hole which engages with a drive unit for moving said magnesium plates.

6. A magnesium air battery, comprising:
a magnesium fuel element, comprising a plurality of magnesium plates, a foldable front surface separator, and a foldable back separator; and
an electrode, wherein one of the plurality of magnesium plates is inserted into said electrode and generates an electromotive force with such magnesium plates as a fuel, wherein the magnesium plates after the reaction are withdrawn from said electrode.

7. The magnesium air battery of claim 6, wherein:
each said plurality of magnesium plates, prior to reaction, and said plurality of magnesium plates, after reaction, are arranged to be stacked.

8. The magnesium air battery of claim 6, wherein:
said electrode comprises an inlet for inserting said magnesium plates, an outlet for withdrawing said magnesium plates, a cathode with conductivity that supplies electrons to oxygen, and an electrolyte hold-back agent in contact with said cathode and said magnesium fuel element, which impregnate and retain electrolytes.

9. The magnesium air battery of claim 8, wherein:
said cathode is formed from at least one of carbon, metal, or manganese oxide.

10. The magnesium air battery of claim 6, wherein:
said front surface separator and said back separator expand, if one of said plurality of magnesium plates is moved in parallel to a front surface of the magnesium plates.

11. The magnesium air battery of claim 6, wherein:
at least one of said surface separator and said back separator is formed from a transparent film which transmits ions.

12. The magnesium air battery of claim 6, wherein:
at least one of said surface separator and said back separator comprises a hole which engages with a drive unit for moving said magnesium plates.

13. The magnesium air battery of claim 6, wherein:
said surface separator is connected to a central part of the respective surfaces of said plurality of magnesium plates, and is accordion-foldable;
said back separator is connected to respective central back part of said plurality of magnesium plates, and is accordion-foldable.

14. The magnesium air battery of claim 6, wherein:
at least one of said surface separator and said back separator is formed from a transparent film which transmits ions; and
at least one of said surface separator and said back separator comprises a hole which engages with a drive unit for moving said magnesium plates.

15. An electronic apparatus comprising a magnesium air battery, the magnesium air battery comprising:
a magnesium fuel element, comprising a plurality of magnesium plates, a foldable front surface separator, and a foldable back separator; and
an electrode, wherein one of the plurality of magnesium plates is inserted into said electrode and generates an electromotive force with such magnesium plates as a fuel, wherein the magnesium plates after the reaction are withdrawn from said electrode.

16. An electronic apparatus as stated in claim 15, further comprising:
a rechargeable secondary battery in addition to the magnesium air battery;
wherein the apparatus is configured to charge said secondary battery by causing an electromotive force in said magnesium air battery, if the remaining capacity of said secondary battery is equal to or less than a threshold.

17. An electronic apparatus as stated in claim 16, wherein at least one of said front surface separator and said back separator comprises a hole which engages with a drive unit for moving said magnesium plates.

18. An electronic apparatus as stated in claim 16, wherein said front surface separator and said back separator expand, if one of said plurality of magnesium plates is moved in parallel to a front surface of the magnesium plates.

19. An electronic apparatus as stated in claim 16, wherein:
at least one of said front surface separator and said back separator is formed from a transparent film which transmits ions.

20. An electronic apparatus as stated in claim 16, wherein:
said electrode comprises an inlet for inserting said magnesium plates, an outlet for withdrawing said magnesium plates, a cathode with conductivity that supplies electrons to oxygen, and an electrolyte hold-back agent in contact with said cathode and said magnesium fuel element, which impregnate and retain electrolytes; and
said cathode is formed from at least one of carbon, metal, or manganese oxide.

* * * * *

UNITED STATES PATENT AND TRADEMARK OFFICE
CERTIFICATE OF CORRECTION

PATENT NO. : 10,270,144 B2
APPLICATION NO. : 15/301714
DATED : April 23, 2019
INVENTOR(S) : Okemoto et al.

Page 1 of 1

It is certified that error appears in the above-identified patent and that said Letters Patent is hereby corrected as shown below:

In the Claims

Column 8
Claim 1: Line 44: Delete "to"

Signed and Sealed this
Twenty-eighth Day of May, 2019

Andrei Iancu
*Director of the United States Patent and Trademark Office*